United States Patent [19]

Jenkins et al.

[11] 4,333,096
[45] Jun. 1, 1982

[54] SEED PLANTER MONITOR

[75] Inventors: John P. Jenkins, Mackinaw; Stephen W. Rector, Bloomington; John J. McCarty; William Hammond, both of Peoria, all of Ill.

[73] Assignee: Field Electronics Inc., Bloomington, Ill.

[21] Appl. No.: 61,421

[22] Filed: Jul. 27, 1979

[51] Int. Cl.³ .................. G06F 15/20; G08B 19/00
[52] U.S. Cl. .................... 340/684; 111/1; 221/3; 221/8; 221/21; 235/92 PC; 364/555
[58] Field of Search .............. 340/684; 364/479, 555; 235/92 PC, 92 PE; 111/1; 221/2, 3, 7, 8, 21

[56] References Cited

U.S. PATENT DOCUMENTS

| | | | |
|---|---|---|---|
| 3,723,989 | 3/1973 | Fathauer et al. | 340/684 X |
| 3,912,121 | 10/1975 | Steffen | 111/1 X |
| 3,921,159 | 11/1975 | Steffen | 340/684 X |
| 3,927,400 | 12/1975 | Knepler | 340/684 |
| 3,928,751 | 12/1975 | Fathauer | 111/1 X |
| 4,009,799 | 3/1977 | Fathauer | 221/3 |
| 4,085,862 | 4/1978 | Steffen | 221/8 |
| 4,137,529 | 1/1979 | Anson et al. | 340/684 |
| 4,149,163 | 4/1979 | Fathauer | 340/684 |
| 4,159,064 | 6/1979 | Hood | 111/1 X |
| 4,225,930 | 9/1980 | Steffen | 364/555 |

Primary Examiner—John W. Caldwell, Sr.
Assistant Examiner—Joseph E. Nowicki
Attorney, Agent, or Firm—McCaleb, Lucas & Brugman

[57] ABSTRACT

A seed planter monitor is used with a traveling seed planter operable to periodically dispense seeds in each of a plurality of rows. The monitor, preferably a microcomputer device, comprises individual row counters for counting the seeds planted in each row. The monitor determines the row having the highest deviation from the average number of seeds planted per row. Whenever the maximum deviation exceeds a predetermined limit, an alarm signals an error condition to the planter operator. The monitor also senses and warns the operator of any stoppage occurring in any of the rows within a relatively short stoppage distance. Planting data is displayed to the operator during planting.

12 Claims, 13 Drawing Figures

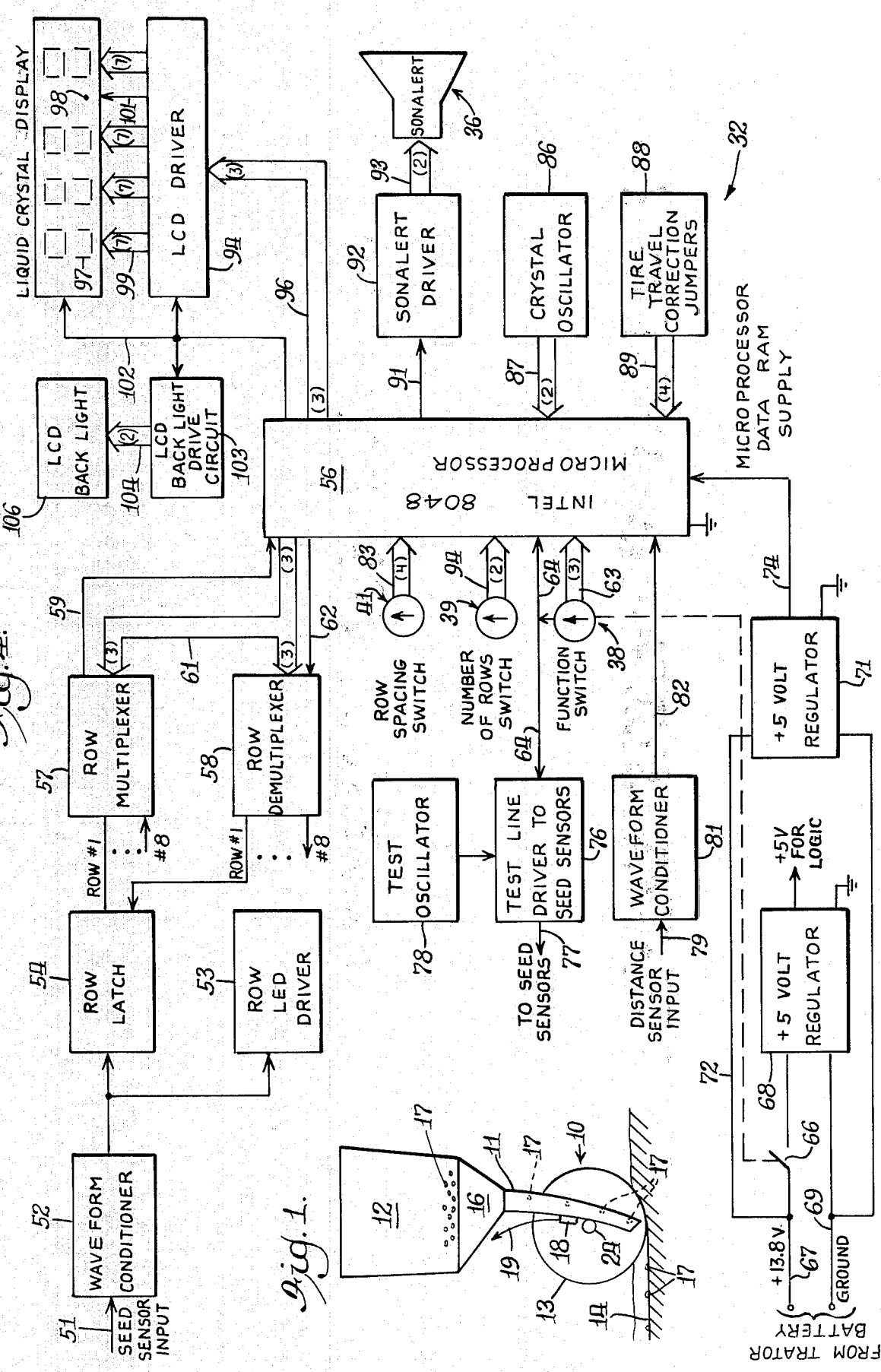

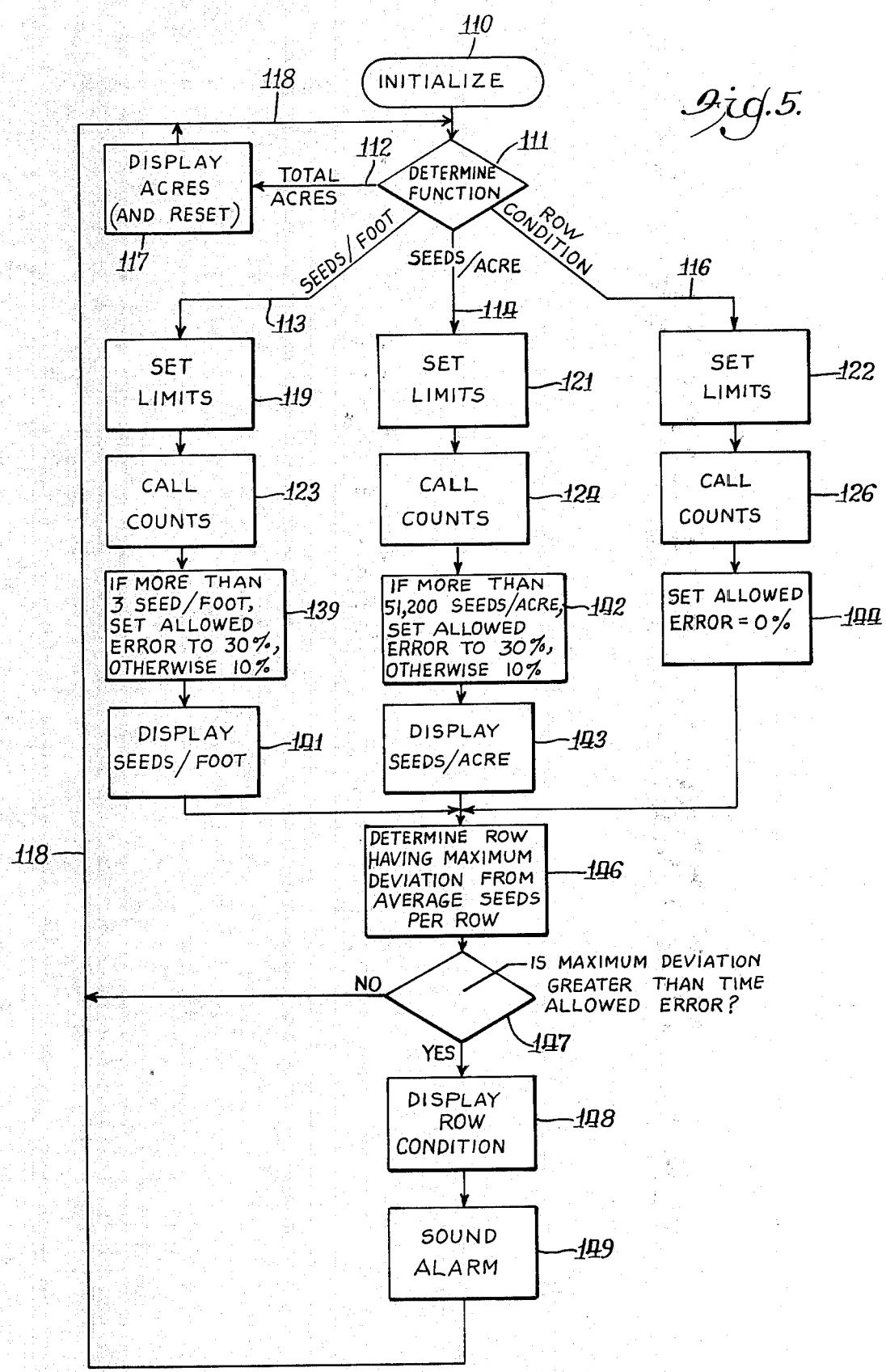

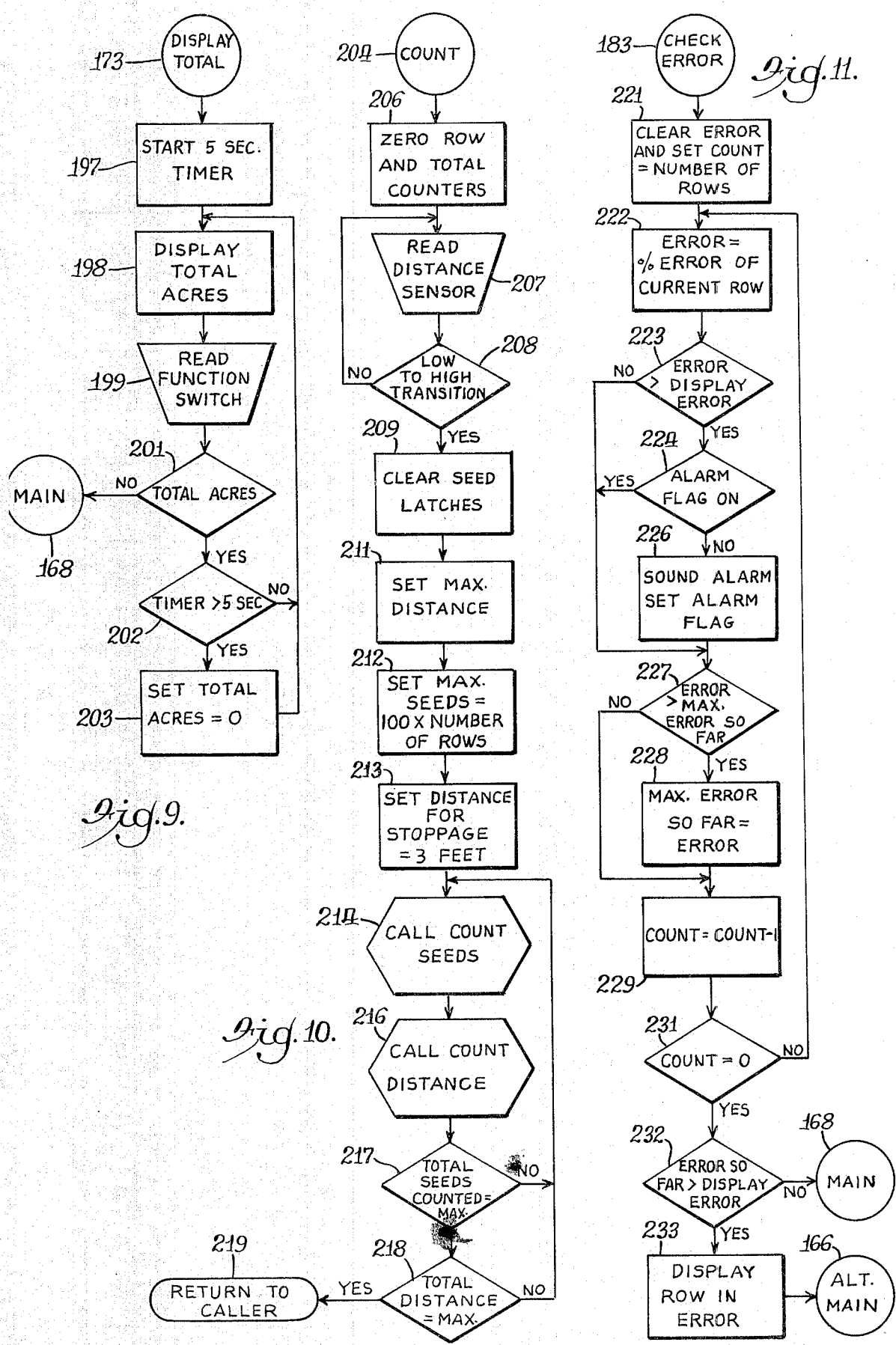

SEED PLANTER MONITOR

BACKGROUND OF THE INVENTION

1. Field of the Invention

The present invention relates in general to seed planting devices and, more particularly, to automatic monitors for use therewith.

2. Description of the Prior Art

As is well-known in the art, a seed planter typically contains a group of seed chutes, one for each row, which automatically dispense individual seeds from hoppers into furrows formed in the ground by the planter as it is moved across the field by a tractor. Modern seed planter monitors typically employ electronic counting devices which receive electrical pulse signals from seed sensors located in the seed dispensing chutes. The monitors usually display to the farmer the rate at which seeds are being planted.

The following patents disclose typical seed planter monitor devices found in the prior art:

| Young | 2,907,015 | September 29, 1959 |
|---|---|---|
| Gregory, Jr. | 3,355,102 | November 28, 1967 |
| Gregory, Jr. | 3,422,776 | January 21, 1969 |
| Ryder, et al | 3,527,928 | September 8, 1970 |
| Schenkenberg | 3,537,091 | October 27, 1970 |
| Fathauer, et al | 3,723,989 | March 27, 1973 |
| Steffen | 3,912,121 | October 14, 1979 |
| Fathauer | 3,928,751 | December 23, 1975 |
| Steffen | 3,974,377 | August 10, 1976 |
| Fathauer | 4,009,799 | March 1, 1977 |
| Anson, et al | 4,137,529 | January 30, 1979 |
| Fathauer | 4,149,163 | April 10, 1979 |

The more sophisticated prior art seed planter monitors generally operate on the principle that the number of seeds planted in a predetermined single row is counted during a certain time period. The seed density is then computed and displayed during the planting operation. The seeds planted in each row are monitored individually according to a predetermined row sequence or a row selection by the farmer.

The inherent disadvantage of this approach is that any one row can be totally or partially inoperative for some period of time before the monitor detects the row condition.

SUMMARY OF THE INVENTION

The seed planter monitor of the present invention provides solutions to problems inherent in prior known seed planter monitors by including individual row counters, responsive to seed sensors, for counting the seeds planted in each row simultaneously. In general, the monitor maintains a running total of the seeds planted in each row, with the result that a partial or total failure in any row will be detected almost immediately. Planting data is visually displayed to the farmer to permit monitoring of the planter operation.

The monitor of the present invention preferably comprises a microprocessor which maintains a count of the seeds planted in each row and determines the maximum of the deviations between each row count and the average number of seeds planted per row. The monitor also includes an error checking feature for signalling an error condition occurring whenever the maximum deviation exceeds a predetermined limit. Preferably, this limit is chosen to be 10 percent above or below the average for seeds such as corn, and 30 percent for small seeds such as soybeans. According to another aspect of the present invention, the monitor warns the farmer of any stoppage occurring in any of the rows within a relatively short stoppage distance so that corrective action can be taken immediately.

Accordingly, it is an important object of the present invention to provide an automatic monitor for a seed planter which simultaneously senses and counts the seeds planted in all of the rows.

It is another important object of the present invention to determine and display the maximum of the deviations between the row counts and the average number of seeds planted per row and to provide an alarm signal when the maximum deviation exceeds a predetermined limit.

It is a further important object of the present invention to provide a seed planter monitor operable to detect a total stoppage in any row within a relatively short stoppage distance.

Yet a further important object of the present invention is to provide an efficient, and accurate seed planter monitor utilizing a microcomputer.

These and other objects of the present invention will become apparent from the following description which, when taken in conjunction with the accompanying drawings, discloses a preferred embodiment of the invention.

BRIEF DESCRIPTION OF THE DRAWINGS

FIG. 1 is a side elevational view of a portion of a seed dispenser for one typical row of a multiple-row seed planter used in conjunction with the present invention;

FIG. 4 is a block diagram illustrating the basic electrical features of the preferred seed planter monitor adapted for a typical eight-row planter;

FIGS. 5 and 6 are logic flow diagrams illustrating the basic program logic of the monitor of FIG. 4; and FIGS. 7 through 13 are additional logic flow diagrams illustrating the detailed microprocessor program logic.

DESCRIPTION OF THE PREFERRED EMBODIMENT

Monitor Hardware

Figure 6:
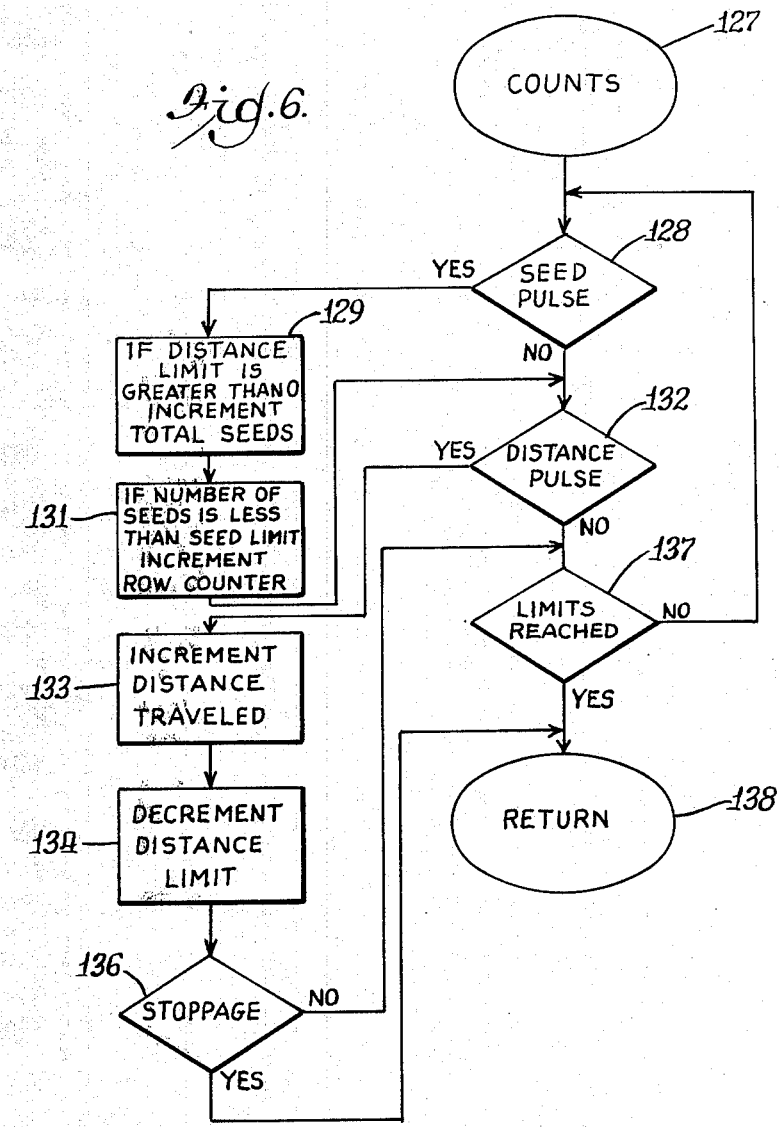

With particular reference to FIG. 1, the seed planter monitor of the present invention is utilized in conjunction with a multiple-row seed planter having a typical planting mechanism 10 for each row. In this mechanism, a seed dispensing chute 11 is connected to an associated seed hopper 12 which stores the seeds during planting. A wheel 13 forms a furrow 14 in the ground surface as the seed planter is moved by a tractor across the field in the direction of the arrow shown in FIG. 1 and a dispensing mechanism 16 periodically dispenses seeds 17 through the chute 11 into the furrow. A seed sensor, preferably an optical device such as that disclosed in Bell U.S. application Ser. No. 888,398 entitled "OPTICAL SEED SENSOR FOR SEED PLANTER MONITOR", assigned to the assignee of the present invention, is connected to the seed planter monitor of the present invention through a suitable cable 19. This seed sensor, which contains light-emitting diodes and a light-receiving solar cell, provides an electrical pulse or signal to the monitor each time a seed 17 drops down the chute 11 past the sensor.

Another electrical input required for the preferred monitor of the present invention comprises a series of distance pulses representative of planter travel. For this purpose, a distance wheel 21 (FIG. 2), preferably a split hub having half portions 22, 23, is disposed about an axle 24 which interconnects each of the planting wheels 13. The distance wheel 21 contains a plurality of peripherally located magnets 26, each of which generates a magnetic field to be sensed by a Hall effect sensor 27 proximately disposed to the distance wheel 21. A spacer wheel 28, suitably secured to the planter frame by an arm 29, insures that the sensor 27 will be in magnetic engagement with each magnet 26 as it moves past the sensor when the distance wheel 21 rotates upon planter travel, causing the sensor to supply electrical pulse distance signals to the monitor through a cable 31. The number of magnets 26 is selected such that two such pulses are produced for each foot of planter travel.

Figure 3:
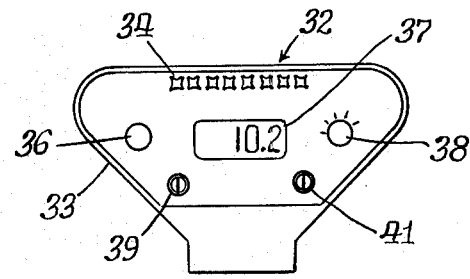
FIG. 3 is a vertical elevational view illustrating the housing of the preferred embodiment of the seed planter monitor according to the present invention.

With reference to FIG. 3, the seed planter monitor, generally designated by reference numeral 32, comprises a console or housing 33 for the microprocessor and its associated electronic circuitry. The monitor 32 is mounted in the cab of the tractor (not shown) in view of the farmer during the actual planting process.

The console 33 comprises a series of individual row lights 34 which flash each time a seed 17 drops through the associated row chutes 11 in order to indicate a row malfunction. An audible alarm or sonalert 36 is operable alert the operator of a row malfunction or error condition. A display 37, preferably a liquid crystal device, displays planting information under control of a function switch 38 which selects the following monitor functions:

(1) the test mode for checking monitor operation;
(2) the seeds per foot position, in which the population of the seeds being planted is displayed in terms of the average number of seeds per foot;
(3) the average seeds per acre position;
(4) the row condition position, in which the monitor displays the row having the greatest deviation between its planting density and the average of all of the rows and also indicates whether that row is planting above or below the average and the percent error; and
(5) the acre counter position, with a reset feature, to control the display to indicate the number of acres travelled.

On the console 33 is a row selector 39 which provides a data input to the monitor indicative of the number of rows being planted, typically 4, 6, 8, 12 or 16. Another data parameter switch 41 is set, upon installation of the monitor, for the spacing of the rows being planted; this switch contains 10 positions representing row spacing adjustments varying from 20 to 40 inches.

FIG. 4 is a schematic block diagram illustrating the basic features of the preferred monitor of the present invention adapted for use with an eight-row planter. The basic operation of the monitor is the same regardless of the number of rows of the planter with which it is used.

With reference to that figure, a seed sensor input 51 for one typical row provides pulses to a waveform conditioner 52 as seeds 17 pass through the row chute 11 (FIG. 1) past its sensor 18. A separate seed sensor input is provided for each row. The waveform conditioner, which preferably comprises a quad differential line receiver such as the Motorola No. MC3486, receives pulses from the seed sensor 18 and shapes them into sharp, leading-edge pulses. The output of each waveform conditioner 52 provides a signal to a row light-emitting diode (LED) driver 53 and a row latch 54.

The row LED driver 53, which preferably comprises an edge trigger quad timer, produces accurate time pulses of sufficient amplitude to drive its associated row light 34. Because the waveform conditioner 52 provides pulses of very short duration, the driver 53 serves as a pulse stretcher which insures that its associated row light 34 will be illuminated upon seed planting for a long enough time period so as to be seen. The LED driver preferably comprises a Signetics No. NE559.

The row latch 54 is preferably a Texas Instruments No. 74LS74 dual D-type positive-edge-triggered flip-flop with preset and clear terminals. The row latch 54 receives the pulse from its associated waveform conditioner 52 and maintains a latch condition until a microprocessor 56 has had time to examine that particular row, read the latch condition and then reset the latch.

The row latches 54 for all of the rows are connected to a row multiplexer 57, preferably a Texas Instruments No. 74LS151, which is a one of eight data selector-multiplexer operable to select one of eight data sources and perform a parallel to serial data conversion. The microprocessor 56 is connected to the row latches 54 through a row demultiplexer 58, preferably a Texas Instruments No. 75LS138, which is a three to eight line decoder-demultiplexer. This device resets the row latches 54 under command of the microprocessor 56.

The row multiplexer 57 is connected to the microprocessor 56 through a data input line 59. Another data input line 62 connects the microprocessor to the row demultiplexer 58. Three binary select lines 61 connect the microprocessor 56 to the row multiplexer 57 and the row demultiplexer 58.

The microprocessor 56 preferably comprises an Intel Corporation Model 8048 single chip microcomputer having a central processor unit, a ROM program memory, a RAM data memory and input and output ports. In general, the microprocessor ROM stores instructions, which comprise the coded information that control the activities of the central processor unit. The microprocessor RAM stores the coded data information processed by the central processor unit. The central processor unit reads each instruction from the program memory according to a predetermined sequence in order to control its data processing activities. The microprocessor program, which will be discussed later, is illustrated in the logic flow diagrams of FIGS. 5–13.

The main function switch 38, which is connected to the microprocessor 56 through three input lines 63 and a reset line 64, is a six-position two-pole switch. One grounded pole of the function switch 38 provides instructions to the microprocessor 56 through lines 63 and 64. The other pole controls an on-off switch 66 which connects a 13.8 volt power input line 67 to a 5 volt regulator 68 operable to supply 5 volt DC power to the logic. The power input line 67 and a ground line 69, which is also connected to the regulator 68, are connected to the tractor battery. Another 5 volt regulator 71, connected to the power input line 67 and the ground line 69 by means of lines 72, 73, respectively, provides a separate 5 volt regulated output on a line 74 to the microprocessor data RAM supply. Although the main 5 volt supply to all of the logic is turned off by the switch 66 when the function switch 38 is in its first or off position, the regulator 71 continuously supplies power to the data RAM of the microprocessor, allowing it to maintain a record of the acres planted even though the unit may be turned off. This permits the farmer to maintain a continuing record of the number of acres planted, even though the planting may be interrupted. The microprocessor data RAM draws very little current and will not unduly discharge the tractor battery.

In the second or test position, the main function switch 38 provides an internal reset pulse on line 64 to initialize the microprocessor. This reset pulse also initiates operation of a test line driver 76, in turn connected to the seed sensors through a series of lines 77. The test line driver 76 provides a pulsating potential from a test oscillator 78 to the light emitting diodes in the seed sensors 18 to simulate the passage of seeds through the seed chutes 11. The test line driver 76 preferably comprises a dual peripheral driver such as a Signetics No. 75451 device, and the test oscillator 78 preferably comprises a Texas Instruments No. 74LS14 configured as an oscillator. It should be noted that the microprocessor is not running during the test condition.

In the third position of switch 38, which is the seeds per foot position, the 74LS14 oscillator 78 is connected to provide continuous power to all of the LED units in the seed sensors 18. The function switch provides a ground on one of the lines 63 to instruct the microprocessor to perform the seeds per foot calculations, in a manner to be described.

In its fourth and fifth position, the function switch 38 similarly instructs the microprocessor to perform the seeds per acre and row condition calculations, respectively.

In its sixth and last position, which is a spring return position, the function switch instructs the microprocessor to display the number of acres planted. If the switch is held in this position for more than five seconds, the microprocessor will reset the number of acres memory to zero to reinitiate the acreage counting.

The output cable 31 of the distance sensor 27 (FIG. 2) is connected through an input 79 to a waveform conditioner 81, similar to waveform conditioner 52 for the seed sensor input 51, to provide pulses representative of planter travel to the microprocessor 56 through a lead 82.

The row spacing switch 41 preferably comprises a ten position binary coded decimal switch connected to the microprocessor 56 through four input lines 83 and employs a binary code to provide information to the microprocessor indicative of the row spacing. Similarly, the number of rows switch 39, also a binary coded decimal switch, utilizes a pair of lines 84 to instruct the microprocessor regarding the number of rows planted.

The timing generation for the microprocessor 56 comprises a high gain parallel resonant circuit oscillator 86 controlled by an external six megahertz crystal for frequency reference. This oscillator is connected to the microprocessor 56 through a pair of lines 87.

Reference numeral 88 designates a set of tire travel correction jumpers operable to provide binary coded data through lines 89 to the microprocessor 56 to compensate for variations in the circumference of the ground-engaging tires used by the planter. When the planter utilizes conventional size tires, no correction is necessary and no jumpers are connected. However, if the planter utilizes smaller than normal tires, the first jumper, when connected, indicates that a minus factor is to be employed; the remaining three lines 89 are jumpered in a binary code to make seven adjustments in the negative direction to indicate as many as seven different tire sizes. Removal of the first jumper indicates that the tire size employed is larger than normal; similarly, seven different positive corrections can be made by the jumpers in the other three input lines 89.

During an alarm condition, a signal from the microprocessor 56 on an output line 91 controls a sonalert driver 92, which preferably comprises a dual peripheral NAND driver such as a Signetics No. 75452, to provide a ground to the sonalert 36 through one of the sonalert control lines 93, the other line 93 being connected to the tractor battery supply. For relatively large seeds such as corn, if any one row varies from the average number of seeds per row by more than 10 percent, the sonalert will be energized. However, the microprocessor 56 is programmed such that if more than 51,200 seeds per acre are being planted, the alarm condition will not exist unless any one row deviates more than 30 percent from the average number of seeds per row; the tolerance is automatically changed for relatively high seed densities because typical planters cannot maintain a relatively close planting tolerance for small seeds, such as soybeans, which require large numbers of seeds per acre.

The microprocessor 56 is connected to a liquid crystal display (LCD) driver 94, preferably a Mitel Semiconductor No. MD4330, which is a CMOS/LSI thirty stage static shift register incorporating selectable true/-complement outputs for each stage. The LCD driver 94 drives the liquid crystal display 37, typically a Shelly No. 8665 or an IEE No. 1658, which contains four seven-segment readouts 97 plus a decimal point 98, through four seven-line controls 99 and a single line control 101, respectively. Microprocessor 56 provides serial data to the LCD driver 94 which in turn provides appropriate signals to the liquid crystal display 37.

A control lead 102 interconnects the microprocessor 56, the back plane of the LCD 37, the LCD driver 94 and an LCD back light drive circuit 103. The drive circuit 103 supplies an AC signal of approximately 35 to 40 volts at approximately 400 hertz through a pair of lines 104 to an LCD back light 106, which preferably comprises an Atkins and Merrill No. 0433 device. The LCD backlight 106 provides required external lighting to the LCD 37; this is particularly important when the planter is operated after dark. The LCD driver 94 is designed to drive the readouts of display 37 directly and the AC signals required for the back plane of the display are generated simply by applying a low frequency signal to the true/complement input and also to the back plane of the display. A signal from the back plane of the LCD 37 on line 102 drives one section of a Signetics No. 75452 driver contained within the LCD back light drive circuit 103 to provide a low-voltage AC signal to a coupling transformer (not shown) which steps the voltage up to the required 35 to 40 volt level required by the LCD back light 106.

BASIC MICROPROCESSOR PROGRAM LOGIC

In order to understand the operation of the monitor 32, reference should now be made to FIGS. 5 and 6, which are simplified logic flow diagrams illustrating the basic operation of the microprocessor 56; the detailed program logic diagrams appear in FIGS. 7 through 13. As shown in FIG. 5, the operation of the microprocessor 56 is initialized at 110 when the main function switch 38 is transferred from the off or test positions to any one of the seeds per foot, seeds per acre, row condition or acres positions. According to a decision block 111, the microprocessor determines the selected function and proceeds according to program branches 112, 113, 114 or 116 corresponding to the total acres, seeds per foot, seeds per acre and row condition functions, respectively.

According to an instruction block 117, when the total acres function is selected, the monitor will display the total number of acres traveled. As previously mentioned, if the function switch is held in the total acres position for more than five seconds, the total acres register will be cleared or reset and the count will be started over again. After block 117, the program enters a main loop 118 and again determines the monitor function according to the block 111.

In the seeds per foot, seeds per acre, or row condition functions, the program sets certain counting limits according to blocks 119, 121 and 122 and then calls the COUNTS subroutine as required by blocks 123, 124 and 126, respectively. This COUNTS subroutine, which requires counting of pulses representative of seeds planted and planter travel, is illustrated in FIG. 6, to which reference should now be made.

After the COUNTS subroutine is initiated at point 127, the program checks to determine the existence of a seed pulse in any row according to a block 128. If there is a seed pulse, according to a block 129, if the distance limit is greater than zero, a register counting the total number of seeds is incremented. According to a block 131, if the number of seeds is less than the seed limit, the register or counter for the number of seeds in the row which detected the seed is incremented. The program then checks for a distance pulse as required by a decision block 132. If there is a distance pulse, indicating that the planter is traveling, a distance traveled counter is incremented according to a block 133. The distance limit is then decremented by block 134. At a block 136, the program then checks for a total stoppage of seeds. If there is no stoppage, a block 137 requires that the program determine whether the limits set by blocks 119, 121 or 122 have been reached. Block 137 would have been accessed directly had there been no distance pulse tested at block 132. If the limits have not been reached, the program re-enters the seed pulse testing block 128. If the limits have been reached or if a stoppage has been detected at block 136, the COUNTS routine reaches a point 138 and returns to the main program shown in FIG. 5.

In the seeds per foot branch of the program, according to a block 139, if the seed density is more than three seeds per foot, the allowed error is set to 30 percent, otherwise to 10 percent. Thereafter, the monitor displays the density in seeds per foot as required by block 141.

In the seeds per acre branch of the program, according to a block 142, if the seed density is more than 51,200 seeds per acre, the allowed error is set to 30 percent, otherwise to 10 percent. As required by a block 143, the density in seeds per acre is displayed.

In the row condition mode, the allowed error is set to zero percent according to a block 144. This setting will always result in display of the row condition.

According to a block 146, the program then determines the row having the maximum deviation from the average number of seeds per row. At a block 147, the maximum deviation is compared to the allowed error set at blocks 139, 142 or 144. If the maximum deviation is greater than the allowed error, according to a block 148, the row condition will be displayed. If the maximum deviation is less than the allowed error, the program returns directly to the main loop 118. In case of an alarm condition, the sonalert 36 will be actuated, as required by a block 149. The program then returns to block 111 and the counting and calculation cycle is repeated.

DETAILED MICROPROCESSOR PROGRAM LOGIC

Figure 7:
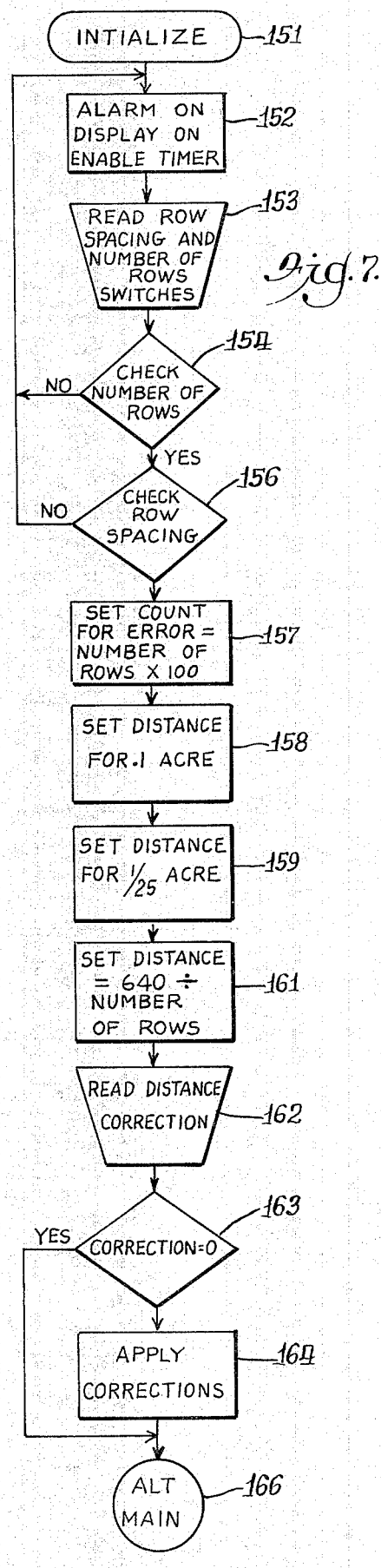

The detailed microprocessor program logic will now be described in conjunction with FIGS. 7 through 13. With particular reference to FIG. 7, the program is initialized at 151 when the function switch 38 is set to one of its monitoring modes, namely, the total acres, seeds per foot, seeds per acre or row condition functions. According to a block 152, the alarm is turned on (and will remain on for 1.6 seconds, as will be shown); the display is actuated to display all of the segments along with the decimal point; and a timer is initiated to control the time period for the alarm. Further, all internal memory registers are cleared with the exception of the total acres counter.

According to a block 153, the microprocessor 56 reads the number of rows switch 39 and the row spacing switch 41. At a decision block 154, the microprocessor checks whether the number of rows selected is valid. If not, the program returns to block 152. According to a decision block 156, the microprocessor reads the setting of the row spacing switch 41. If the row spacing number is invalid, the program returns to block 152. As in the case of the number of rows, the row spacing information is necessary for the program calculations.

At a block 157, a count for error register is set equal to the number of rows multiplied by 100. In the program, when the total number of seeds counted in all of the rows reaches the count for error, the individual row counters will be stopped. The count frozen in each individual row counter is then compared with the number 100, thereby conveniently providing the percent deviation between each row and the average number of seeds planted per row.

According to a block 158, an internal microprocessor table selected in accordance with the number of rows and the row spacing is accessed in order to set into a register the linear distance corresponding to one-tenth of an acre. Similarly, according to a block 159, the linear distance corresponding to one twenty-fifth of an acre is set into another register. As will be shown, a counter for the total number of seeds planted in all of the rows will stop counting seeds when the planter travels each one twenty-fifth of an acre, thereby providing periodically updated information from which the microprocessor can compute conveniently the number of seeds per acre.

At a block 161, a distance is set equal to the number 640 divided by the number of rows for subsequent calculations.

As required by a block 162, the distance correction set by the tire travel correction jumpers 88 is then read. If the correction is non-zero, a block 164 applies the corrections to the distances calculated at blocks 158, 159 and 161. If the correction is zero or if the corrections have already been applied, the program reaches a point 166 requiring entry into an ALTERNATE MAIN program branch illustrated in FIG. 8. In the ALTERNATE MAIN branch, a block 167 requires the alarm 36 to remain on for a period of 1.6 seconds.

The MAIN program, accessed at a point 168 in a manner to be described later, comprises a block 169 which requires that the alarm, if previously turned on, be turned off and that the alarm flag be cleared. According to a block 171, the function switch 38 is read. If the function switch is set in the total acres mode, a decision block 172 will direct the program to a point 173 requiring entry into the DISPLAY TOTAL subroutine (FIG. 9) for display of the acres planted in a manner to be described later.

If the seeds per foot mode is selected, a decision block 174 (FIG. 8) directs the program to an instruction block 176 which sets into a working register the distance, computed at block 161, equal to the number 640 divided by the number of rows. The program then calls the COUNT subroutine (FIG. 10), as required by a block 177, to obtain seed and distance counting information. A decision block 178 tests whether the rate of seed planting is greater or less than three seeds per foot. If it is greater than three seeds per foot, a block 179 sets the allowed error equal to 30; if the rate is less than three seeds per foot, a block 181 sets the error equal to 10. In either case, a block 182 then requires the monitor to display the seeds per foot ratio calculation and the program reaches a point 183 for entry into the CHECK ERROR subroutine, which is illustrated in FIG. 11 and which will be described later.

If the seeds per acre function is selected by the function switch 38, a decision block 184 (FIG. 8) directs the program to an instruction block 186 which sets into a register the distance, previously computed at block 159, corresponding to one twenty-fifth of an acre. In a manner similar to that in the seeds per foot function, at a block 187 the program calls the COUNT subroutine and then proceeds to block 188 to check whether the rate of seeds being planted is greater or less than 51,200 seeds per acre. If it is greater than that number, a block 189 sets the allowed error equal to 30; if not, a block 191 sets the allowed error equal to 10. At a block 192, the program then requires the monitor to display the computed seeds per acre ratio and the program proceeds to point 183 to begin the CHECK ERROR subroutine.

If neither the total acres, seeds per foot or seeds per acre modes are selected, the fall-through condition is the row condition mode, and the program is directed to a block 193 which requires a distance register to be set equal to one.

The program thereafter calls the COUNT subroutine, as required by block 194. A block 196 sets the allowable error equal to zero, thereby requiring display of the row condition regardless of the actual row error. The program proceeds to point 183 and beings the CHECK ERROR subroutine.

Blocks 176, 186 and 193 set the limits required by the blocks 119, 121 and 122 in the basic logic flow diagrams of FIG. 5.

Figure 8:
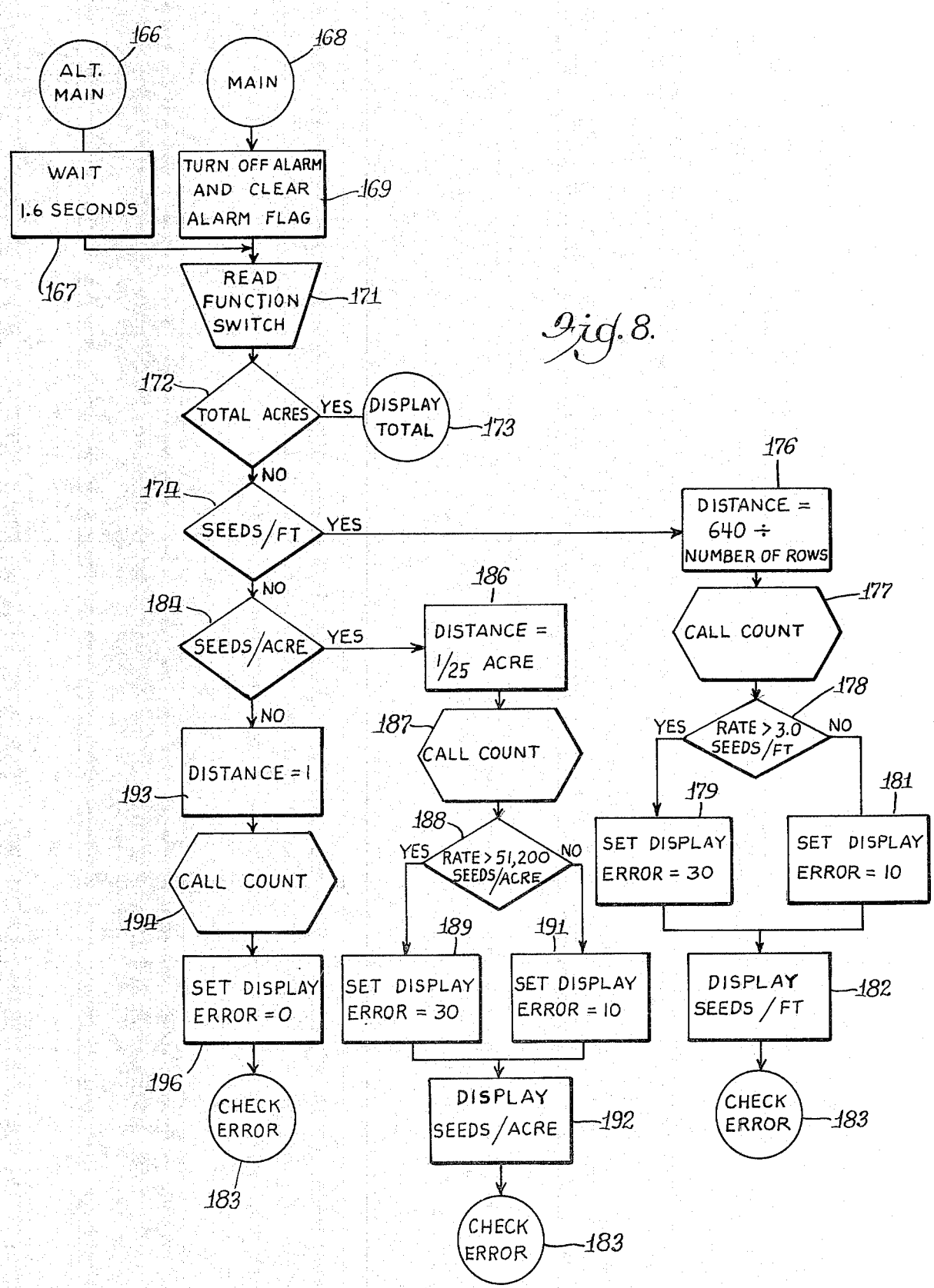

With reference to FIG. 9, the DISPLAY TOTAL subroutine begins at a point 173 and, according to a block 197, starts a five second timer. A block 198 requires display of the total acres planted by the planter. A block 198 requires display of the total acres planted by the planter. A block 198 requires the program to again read the function switch. If the function switch 38 is still in the total acres mode, the program proceeds to a decision block 202 which checks to determine whether the timer has run more than five seconds. If the main function switch 38 is not in the total acres mode, the program proceeds to point 168 to begin the MAIN program (FIG. 8). If the timer has run more than five seconds, a block 203 resets the total acres register by clearing it and the program then proceeds back to block 198.

Figure 2:
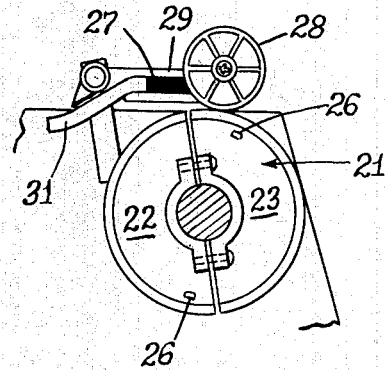
FIG. 2 is a side elevational view of a distance sensor embodying another aspect of the present invention.

As previously discussed in connection with FIG. 8, the direction blocks 177, 187 and 194 require calling of the COUNT subroutine, which will now be described with reference to FIG. 10. In this subroutine, the microprocessor receives periodically updated seed and distance counting information. The COUNT subroutine begins at a point 204 and the program is directed to a block 206, which requires that all of the row and total counters be cleared or zeroed. A block 207 requires the microprocessor to read the distance sensor 27 (FIG. 2). A decision block 208 checks to determine the presence of a low to high transition at the output of the distance sensor, indicating that the planter is moving. If there is no transition, the program returns back to block 207. If there is a transition, a block 209 clears all of the seed latches 54 (FIG. 4) and then, according to a block 211, sets into a working register the linear distance previously computed at blocks 193, 186 or 176, called the maximum distance.

Another block 212 sets into a working register the seed limit previously computed at block 157, called maximum seeds, equal to the number 100 multiplied by the number of rows. A block 213 then sets into a register the number of pulses corresponding to a stoppage distance of three feet. Because the number of magnets 26 (FIG. 2) on the distance wheel 21 are such that two pulses are produced for each foot of planter travel, six pulses correspond to a preferred stoppage distance of three feet. It will be seen that if a total stoppage in any of the rows occurs during three feet of planter travel, the sonalert alarm 36 will be actuated to immediately warn the farmer.

Figure 12:
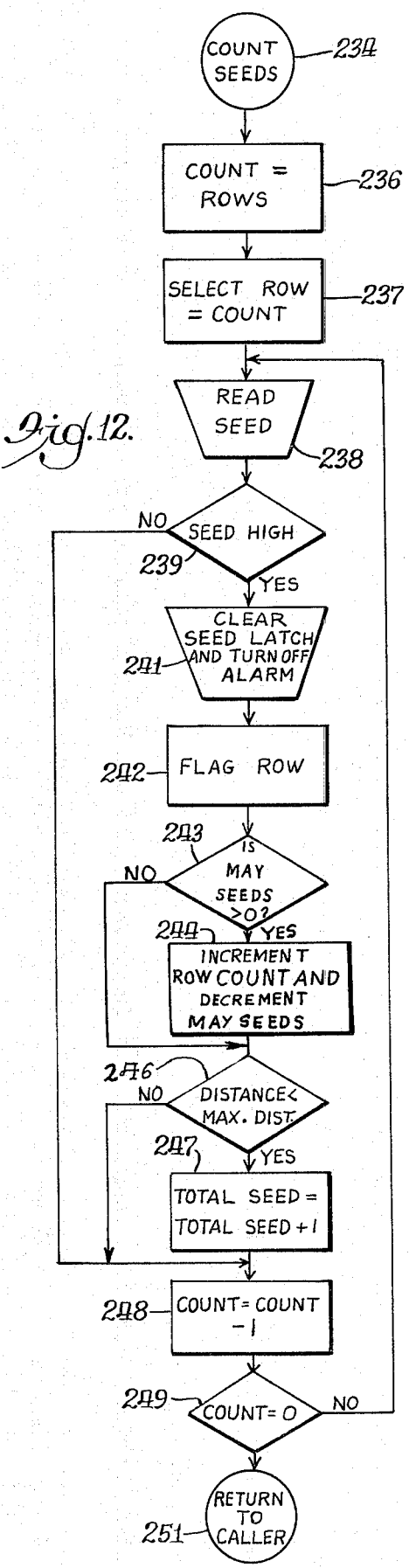

According to a direction block 214, the COUNT seeds subroutine, illustrated in FIG. 12, is then accessed. Another direction block 216 calls the COUNT DISTANCE subroutine, illustrated in FIG. 13. These subroutines will be described later.

A decision block 217 (FIG. 10) checks to determine whether the total seeds counted is equal to the maximum number of seeds set by register 212. If not, the program returns to the COUNT SEEDS subroutine pursuant to the direction block 214. Another decision block 218 checks to determine whether the total distance traveled is equal to the maximum distance set by block 211. If not, the program loops back to return to the COUNT DISTANCE subroutine. If both the total seeds counted and the total distance traveled satisfy these preset limits, then the program reaches a point 219 and is directed to return to the caller of the COUNT subroutine. Thus, two conditions are required for a seed and distance information update.

FIG. 11 illustrates the CHECK ERROR subroutine which is accessed in the seeds per foot, seeds per acre and row condition functions for the purpose of checking the error in the row farthest out of tolerance. The CHECK ERROR subroutine begins at point 183. A block 221 requires that an error register be cleared and a count register be set with a number equal to the number of rows. A block 222 sets into an error register the percent error of the current row being examined. A decision block 223 checks to determine whether that error is greater than the display error set by blocks 179, 181, 189, 191 or 196, as previously described. If so, a decision block 224 then checks to determine whether an alarm flag is already on, indicating that the system is already in an error condition. If the system is not already in an alarm condition, a block 226 requires that the sonalert 36 be turned on and that the alarm flag be set. If the alarm flag is already on and the error in the row being tested is found to be greater than the display error, block 226 is skipped; the system is already in an alarm condition and does not have to be re-alarmed.

If the error in the row being tested does not exceed the display error limit, a block 227 checks to determine whether the error in the row being examined is greater than the maximum error so far. If so, then a block 228 replaces the maximum error so far with the higher error of the current row; if not, block 228 is skipped. A block 229 decrements the count register and a decision block 231 checks to determine whether the count is equal to zero. This procedure insures that the CHECK ERROR subroutine examines all of the rows. The program returns to block 222 and continues through the loop until all of the rows have been tested.

When the decision block 231 determines that all of the rows have been tested, a decision block 232 checks to determine whether the error so far is greater than the display error previously set. If not, the program reaches point 168 to begin the MAIN program. If so, a block 233 requires that the row in error be displayed; the program then enters the ALTERNATE MAIN program branch at point 166.

FIG. 12 illustrates the COUNT SEEDS subroutine, which is entered in accordance with block 214 of the COUNT subroutine (FIG. 10). The COUNT SEEDS routine begins at point 234 and a block 236 sets a count register equal to the number of rows, thereby requiring that the seeds in all of the rows be counted. A block 237 sets the select row register equal to the count. An instruction block 238 requires that the seed latch 54 corresponding to the row under examination be read. A decision block 239 checks to determine whether the row latch is in a high or low condition. If it is in a high condition, a block 241 clears the seed latch. Block 241 also turns off the alarm which may have been previously turned on according to block 152 in FIG. 7 or block 226 in FIG. 11. A block 242 sets a flag for the examined row because its seed latch was in a high condition, indicating that that row is planting. A decision block 243 checks to determine whether the maximum seeds count initially set by block 212 (FIG. 10) is greater than zero. If so, the count for the individual row being examined will be incremented and the maximum seeds count will be decremented according to block 244; if not, block 244 is skipped.

A decision block 246 checks to determine whether the planter distance traveled is less than the maximum distance set by block 211 (FIG. 10). If so, even though the individual row counter may have been stopped by instruction block 244, another total seed counter will be incremented according to block 247; if not, block 247 is skipped. The total seed counter incremented by block 247 is used to provide information required for the seeds per foot and seeds per acre calculations. If the decision block 239 determines that there was no high seed condition at the latch 54 of the row being examined, the program skips blocks 241, 242, 243, 244, 246 and 247.

According to a block 248, the count register is decremented by one. A decision block 249 checks to determine whether the count register has reached zero, indicating that seeds for all of the rows have been counted. If so, the program reaches point 251 and returns to the caller of the COUNT SEEDS subroutine; if not, the program returns to the direction block 238.

Figure 13:
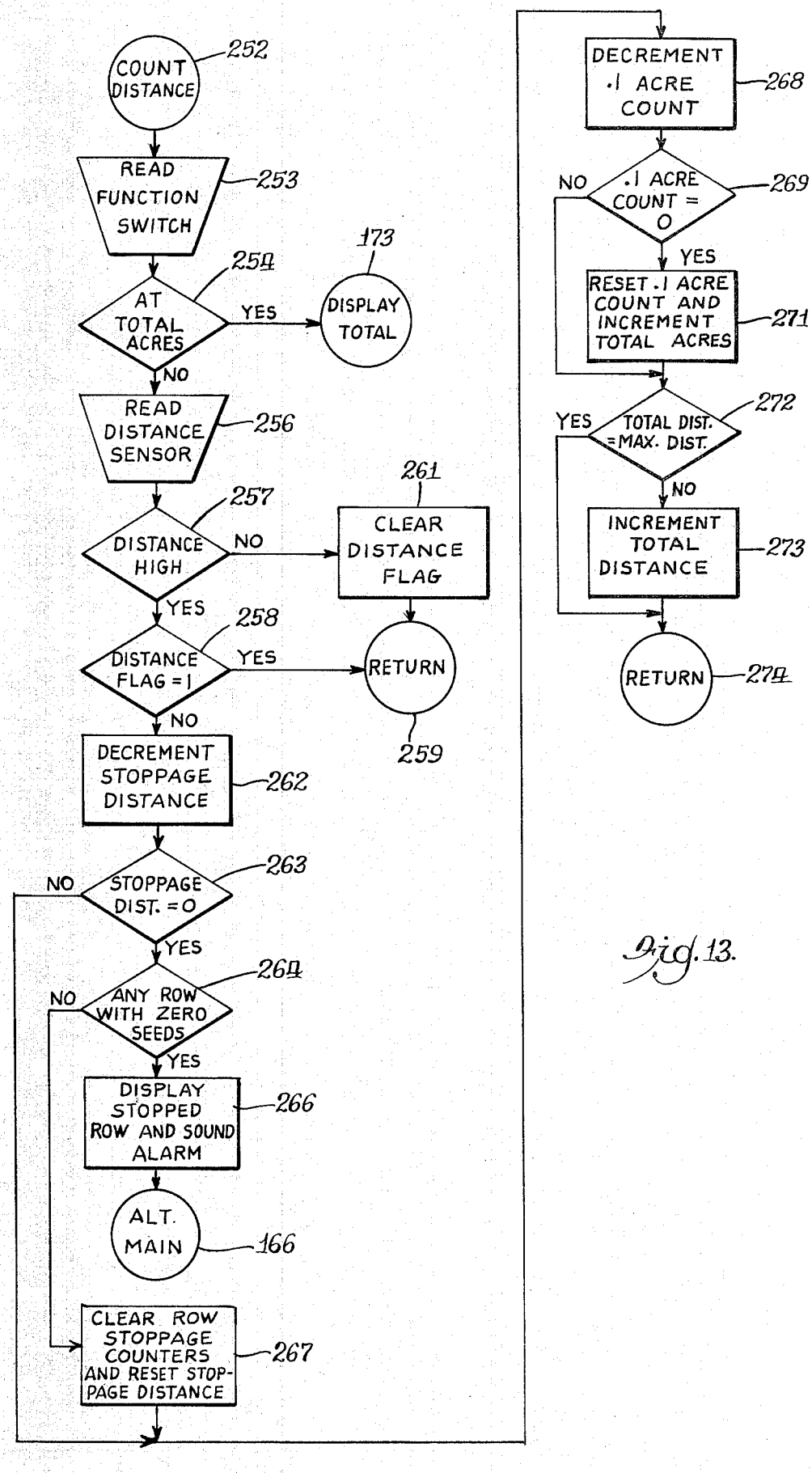

FIG. 13 illustrates the COUNT DISTANCE subroutine which is called by the direction block 216 in FIG. 10. The COUNT DISTANCE subroutine begins at a point 252 and, according to a direction block 253, the microprocessor reads the setting of the function switch 38. If the function switch is set at the total acres mode, a decision block 254 directs the program to a point 173 for the display of the total acres. Thus, the farmer can always obtain a reading of the total acres traveled regardless of the condition of the microprocessor.

A block 256 directs the microprocessor to read the distance sensor 27 (FIG. 2). According to a decision block 257, the program checks to determine whether a distance register is at a high condition, indicating planter travel. If not, a distance flag is cleared according to a block 261 and the program reaches a point 259 requiring that the program return to the caller of the COUNT DISTANCE subroutine. If the distance register is already at a high condition, a decision block 258 checks to see whether the distance flag has been set to one. If so, the program moves to point 259; if not, the stoppage distance register is decremented according to a block 262. As previously discussed, the stoppage distance counter is set to six in the COUNT routine to correspond to three feet of travel. A decision block 263 checks to determine whether the stoppage distance has reached zero. If so, another decision block 264 checks to determine whether any rows have a zero seed count. If so, according to a block 266, the program displays the stopped row and sounds the alarm. The subroutine program then reaches point 166 to begin the ALTERNATE MAIN branch. If the decision block 264 determines that there are no rows with zero seeds, according to a block 267, the row stoppage counters are cleared and the stoppage distance is reset. The program then proceeds to a block 268. If the decision block 263 determines that the stoppage distance is not equal to zero, the program proceeds from that block directly to block 268.

Block 268 requires that the register having the distance pulse count corresponding to 0.1 acre (set by block 158 in FIG. 7) be decremented. A decision block 269 checks to determine whether the 0.1 acre count register is equal to zero, indicating that the planter has traveled 0.1 acre. If so, a block 271 resets that register and increments the total acres counter; if not, block 271 is skipped. The resolution of the total acres counter is preferably in tenths of acres.

A decision block 272 determines whether the total distance traveled is equal to the maximum distance set by block 211 (FIG. 10). If not, the total distance is incremented according to a block 273 and the program proceeds to a point 274 requiring return to the caller of the COUNT DISTANCE subroutine. If the total distance has reached the maximum distance set by block 211, the program skips block 273 and proceeds directly to point 274 requiring return to the caller of this subroutine.

SUMMARY OF OPERATION

From the foregoing description, it will be appreciated that the seed planter monitor of the present invention simultaneously monitors the individual rows through the use of individual row seed counters (see COUNT SEEDS subroutine). In the CHECK ERROR subroutine, the monitor determines the maximum of the deviations between the counts in the individual row counters and the average number of seeds planted per row. Whenever this maximum deviation exceeds a predetermined limit or tolerance, the alarm is sounded to signal to the farmer an error condition. In the MAIN program, this limit or tolerance is automatically adjusted in accordance with the seed density.

In preferred form, the monitor has a total seed counter for counting the total number of seeds planted in all of the rows. According to the COUNT SEEDS subroutine, the individual row counters will stop counting when the total seed counter counts a predetermined number of seeds, called maximum seeds, which is chosen to be 100 times the number of rows. In order to determine the deviation between the count in each row and the average number of seeds per row, the seed count in each individual row counter is compared to the number 100; the difference gives the percentage deviation from the average.

The monitor comprises a total seed counter for counting the seeds planted in all of the rows while the planter travels a predetermined distance, called maximum distance. This counter is used for the seeds per foot and the seeds per acre computations.

If there is a total stoppage in any one row while the planter travels a predetermined stoppage distance, the COUNT DISTANCE subroutine will place the system into an alarm condition.

Under command of the function switch 38, the monitor will selectively display the seeds per foot ratio, the seeds per acre ratio, the condition of the worst row and the number of acres traveled. In the row condition mode, the farmer can examine the condition of the row farthest out of tolerance. The display will indicate the row number, whether it is planting high or low by the letters "H" and "L", and the percent deviation from the average. By providing this information, the danger of skipped, underplanted or over-populated rows is minimized.

It is thought that the present invention and many of its attendant advantages will be understood from the foregoing description, and it is apparent that various changes may be made in the form, construction and arrangement of its component parts without departing from the spirit and scope of the invention or sacrificing any of its material advantages, the form described being merely a preferred embodiment.

The embodiments of the invention in which an exclusive property or privilege is claimed are defined as follows:

1. A monitor for a traveling seed planter operable to periodically dispense seeds in each of a plurality of rows, comprising:
   seed sensing means for sensing the seeds planted in each row;
   row counting means responsive to the seed sensing means and being operable to obtain a separate count of the seeds planted in each row;
   means for determining the average number of seeds planted per row from the counts obtained by the row counting means;
   means for determining the deviations between the counts obtained by the row counting means and the average number of seeds planted per row;
   means for determining the maximum of said deviations;
   error checking means for testing for an error condition occuring whenever said maximum deviation exceeds a predetermined limit; and
   alarm means responsive to said error checking means for signalling an error condition.

2. The monitor of claim 1 and
   display means for displaying said maximum deviation and
   means for identifying the row having said maximum deviation.

3. The monitor of claim 1 and
   stoppage distance means for sensing a predetermined stoppage distance traveled by said planter;
   means responsive to said seed sensing means for detecting a stoppage of any of the rows while the planter travels said stoppage distance; and
   means for signalling a said stoppage.

4. The monitor of claim 3 and
   means for displaying the row having a stoppage.

5. The monitor of claim 1 and distance counting means for counting a predetermined linear distance traveled by said planter;
   seed counting means for counting the total number of seeds planted in all of the rows while the planter travels said predetermined distance;
   means for computing the ratio of said total number of seeds to said predetermined distance; and
   display means for displaying said seeds per distance ratio.

6. The monitor of claim 5 and
   means for automatically establishing said limit in accordance with said seeds per distance ratio.

7. For use with a traveling seed planter operable to periodically dispense seeds in each of a plurality of rows, a monitor comprising:
   seed sensing means for sensing the seeds planted in each row;
   row counting means responsive to the seed sensing means and being operable to obtain a separate count of the seeds planted in each row;
   means for determining the average number of seeds planted per row from the counts obtained by the row counting means;
   means for determining the deviations between the counts obtained by the row counting means and the average number of seeds planted per row;
   means for determining the maximum of said deviations; and
   display means for displaying said maximum deviation.

8. The monitor of claim 7 and
   means for identifying the row having said maximum deviation.

9. The monitor of claim 7 and
   stoppage distance means for sensing a predetermined stoppage distance traveled by said planter;
   means responsive to said seed sensing means for detecting a stoppage of any of the rows while the planter travels said stoppage distance; and
   means for signalling a said stoppage.

10. The monitor of claim 9 and
    means for displaying the row having a stoppage.

11. The monitor of claim 7 and
    area counting means for counting a predetermined area planted by the planter;
    seed counting means for counting the total number of seeds planted in all of the rows while the planter plants said predetermined area;
    means for computing the ratio of said total number of seeds to said predetermined area; and
    display means for displaying said seeds per area ratio.

12. The monitor of claim 11 and means for storing in a register the count of the area planted;
    selectively operable display means for displaying said area count; and
    selectively operable means for resetting said register.

* * * * *

UNITED STATES PATENT AND TRADEMARK OFFICE
CERTIFICATE OF CORRECTION

PATENT NO. : 4,333,096
DATED : June 1, 1982
INVENTOR(S) : John P. Jenkins et al

It is certified that error appears in the above—identified patent and that said Letters Patent is hereby corrected as shown below:

Column 3, line 31, after "operable" insert -- to --;

Column 4, line 31, "75 LS138" should be -- 74 LS138 --;

Column 9, line 54, "beings" should be -- begins --; and

Column 9, lines 63 and 64, delete the duplicative sentence, "A block 198 requires display of the total acres planted by the planter."

Signed and Sealed this

Fifth Day of October 1982

[SEAL]

Attest:

Attesting Officer

GERALD J. MOSSINGHOFF

Commissioner of Patents and Trademarks